United States Patent [19]

Tachihara

[11] Patent Number: 4,550,987
[45] Date of Patent: Nov. 5, 1985

[54] SMALL SIZE TELEPHOTO LENS

[75] Inventor: Satoru Tachihara, Tokyo, Japan

[73] Assignee: Asahi Optical Co., Ltd., Tokyo, Japan

[21] Appl. No.: 492,379

[22] Filed: May 6, 1983

[30] Foreign Application Priority Data

May 13, 1982 [JP] Japan .................................. 57-80799

[51] Int. Cl.$^4$ .............................................. G02B 13/02
[52] U.S. Cl. ..................................... 350/454; 350/464
[58] Field of Search ......................... 350/454, 455, 464

[56] References Cited

U.S. PATENT DOCUMENTS 4,139,264 2/1979 Takahashi ............................ 350/455
4,251,133 2/1981 Tsuji .................................... 350/464

Primary Examiner—John K. Corbin
Assistant Examiner—P. Dzierzynski
Attorney, Agent, or Firm—Lyon & Lyon

[57] ABSTRACT

There is disclosed herein several embodiments of a six-element telephoto lens system comprising, in order from an object, a first positive lens, a second negative lens, third and fourth positive-meniscus lenses having convex surfaces directed toward the object, a fifth negative lens, and a sixth positive lens, said lens system being arranged to meet the following conditions (1) $0.4f < f_{1,2,3} < 0.75f$
(2) $0.35f < f_{1,2,3,4} < 0.6f$
(3) $0.65f < f_1 < 0.8f$
(4) $d_2 < 0.02f$
(5) $0.2f < |f_{5,6}| < 0.45f$, $f_{5,6} < 0$
(6) $0.05 < n_5 - n_6$ where
f is the focal length of the overall lens system,
$f_{1,2,3}$ is the combined focal length of the first through third lenses,
$f_{1,2,3,4}$ is the combined focal length of the first through fourth lenses,
$f_1$ is the focal length of the first lens,
$d_2$ is the distance between the first and second lenses,
$f_{5,6}$ is the combined focal length of the fifth and sixth lenses,
$n_5$ is the refractive index of the fifth lens, and
$n_6$ is the refractive index of the sixth lens.

6 Claims, 8 Drawing Figures

SMALL SIZE TELEPHOTO LENS

BACKGROUND OF THE INVENTION

This present invention relates to a telephoto lens having an F number of the order of 1:4 and an image covering angle of the order of 12°.

Various conditions for making telephoto lenses with the above-described features small in size are disclosed in Japanese Laid-Open Patent Publication No. 53-27422. The lens described in the Publication No. 53-27422 has an increased residual spherical aberration which affects the peripheral edge of an image plane. This lowers the contrast of the low-frequency components of an image, resulting in a poorer focusing performance than expected.

SUMMARY OF THE INVENTION

It is an object of the present invention to provide an improved telephoto lens designed to meet conditions leading to a smaller overall length and an increased performance.

According to an exemplary embodiment of the present invention, a compact or small-size telephoto lens is in the form of a six-element lens system comprising, in order from an object, a first positive lens, a second negative lens, third and fourth positive-meniscus lenses having convex surfaces directed toward the object, a fifth negative lens, and a sixth positive lens. An exemplary lens system is arranged to meet certain conditions which are more fully set forth herein.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERRED EMBODIMENT

Figure 1:
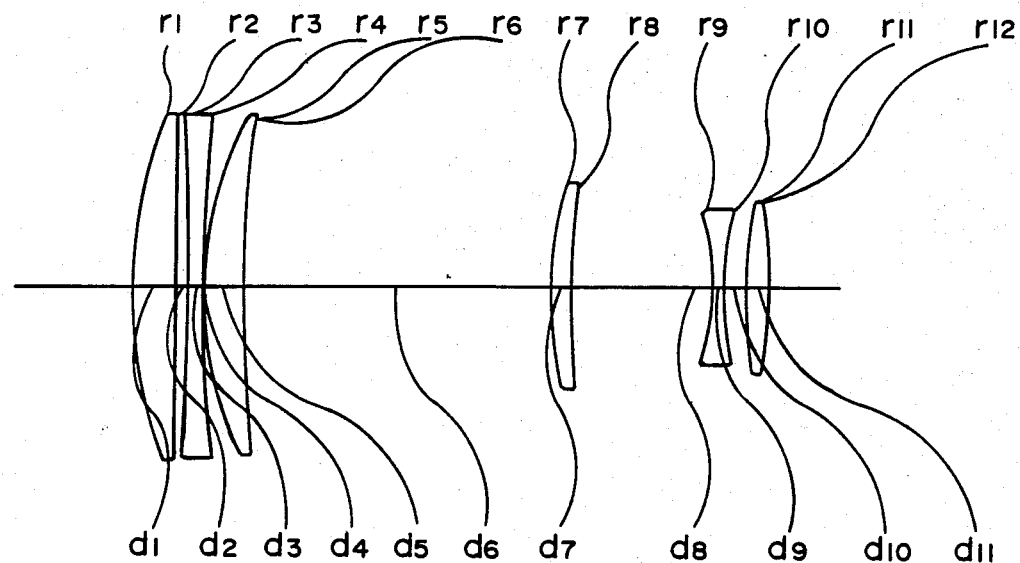
FIGS. 1, 3, 5 and 7 are views showing the arrangements of lenses according to examples of the present invention.
Figure 2:
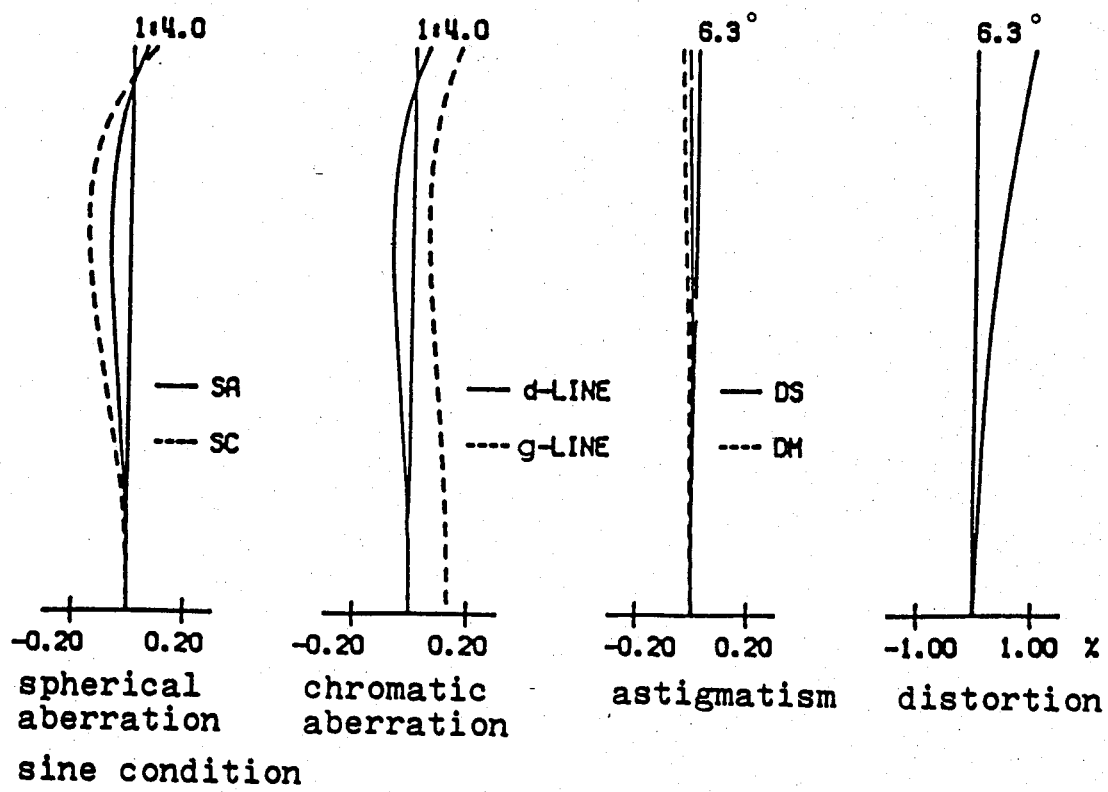
FIGS. 2, 4, 6 and 8 are diagrams illustrative of aberrations caused by the lenses shown in FIGS. 1, 3, 5 and 7 respectively.
Figure 3:
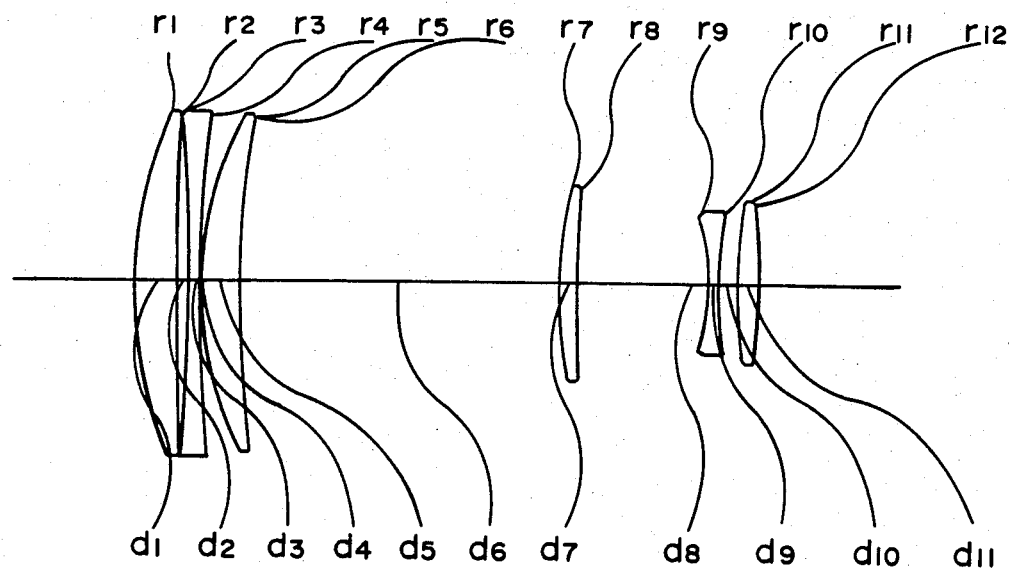
Figure 4:
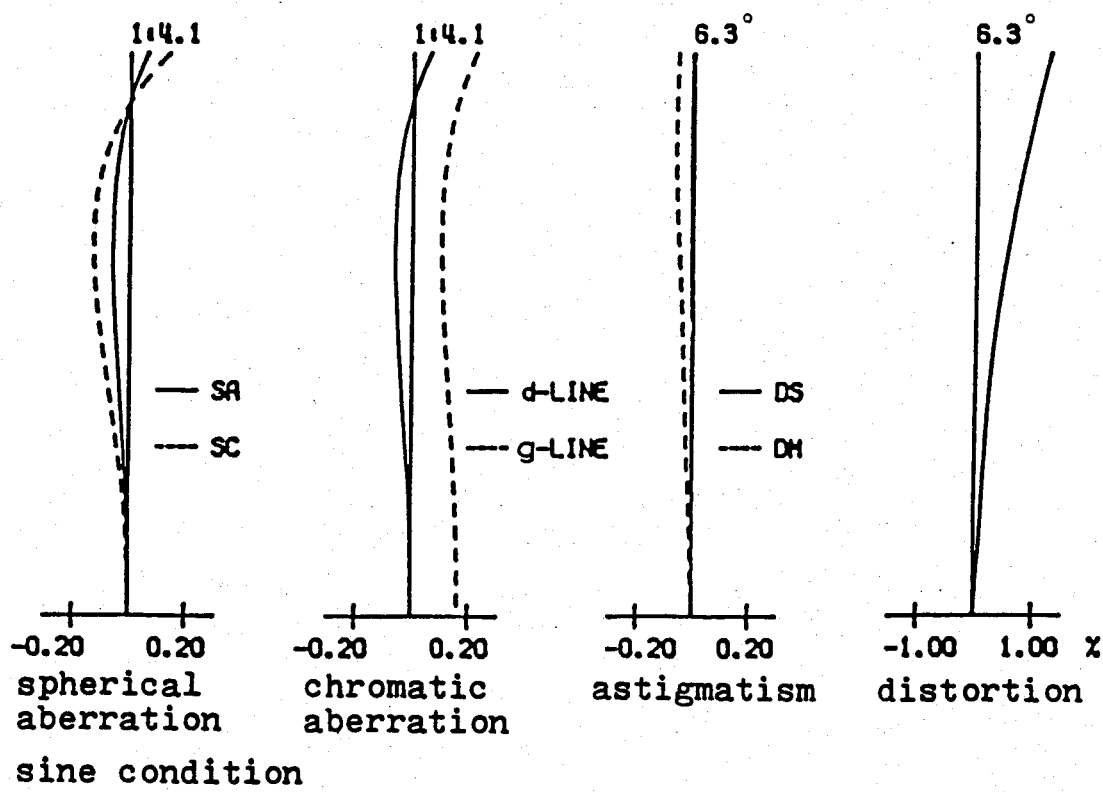
Figure 5:
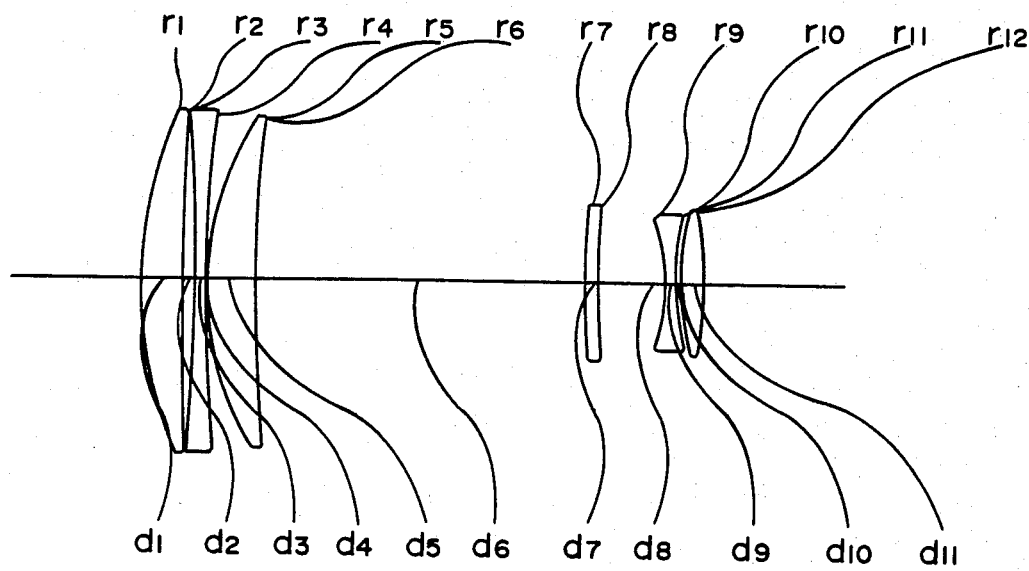
Figure 6:
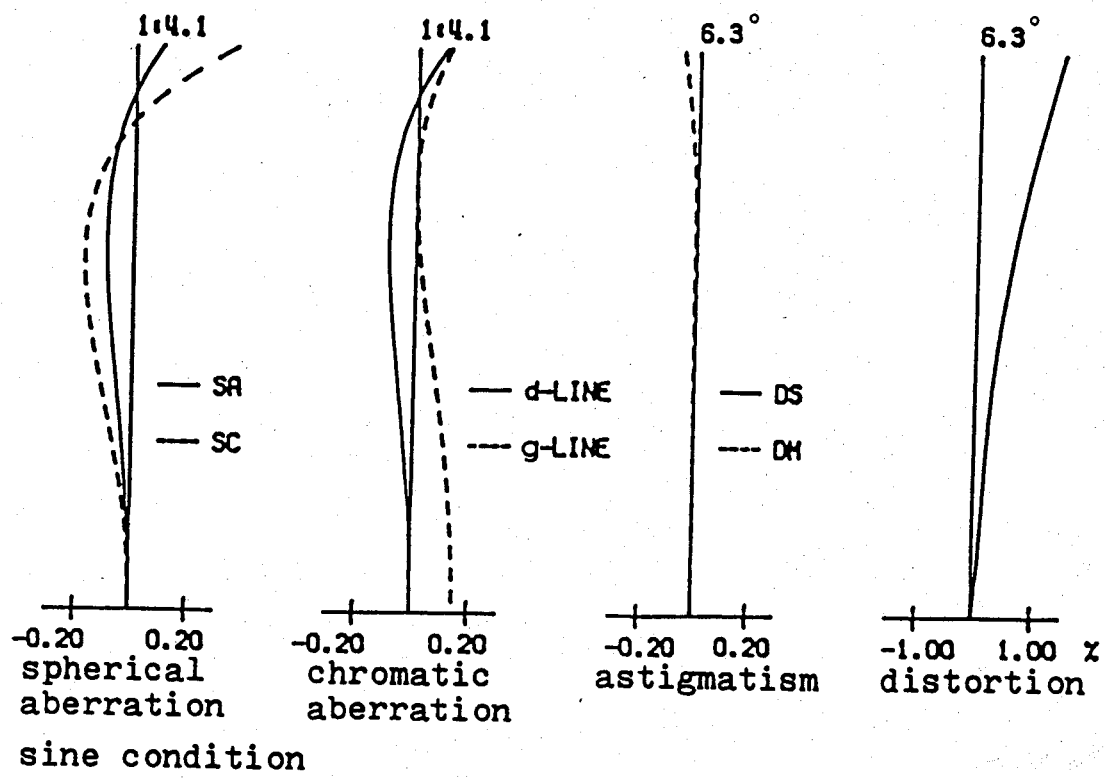
Figure 7:
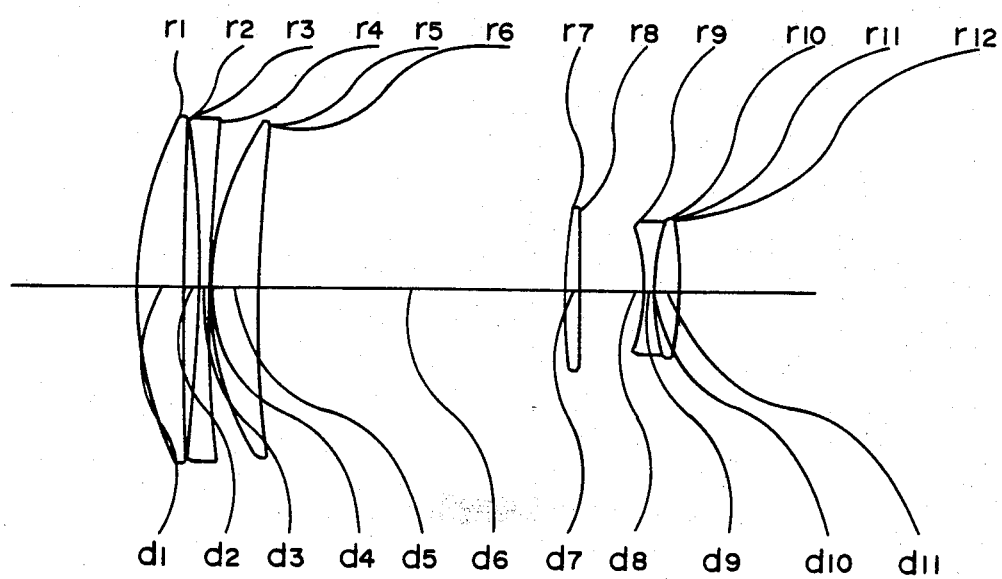
Figure 8:
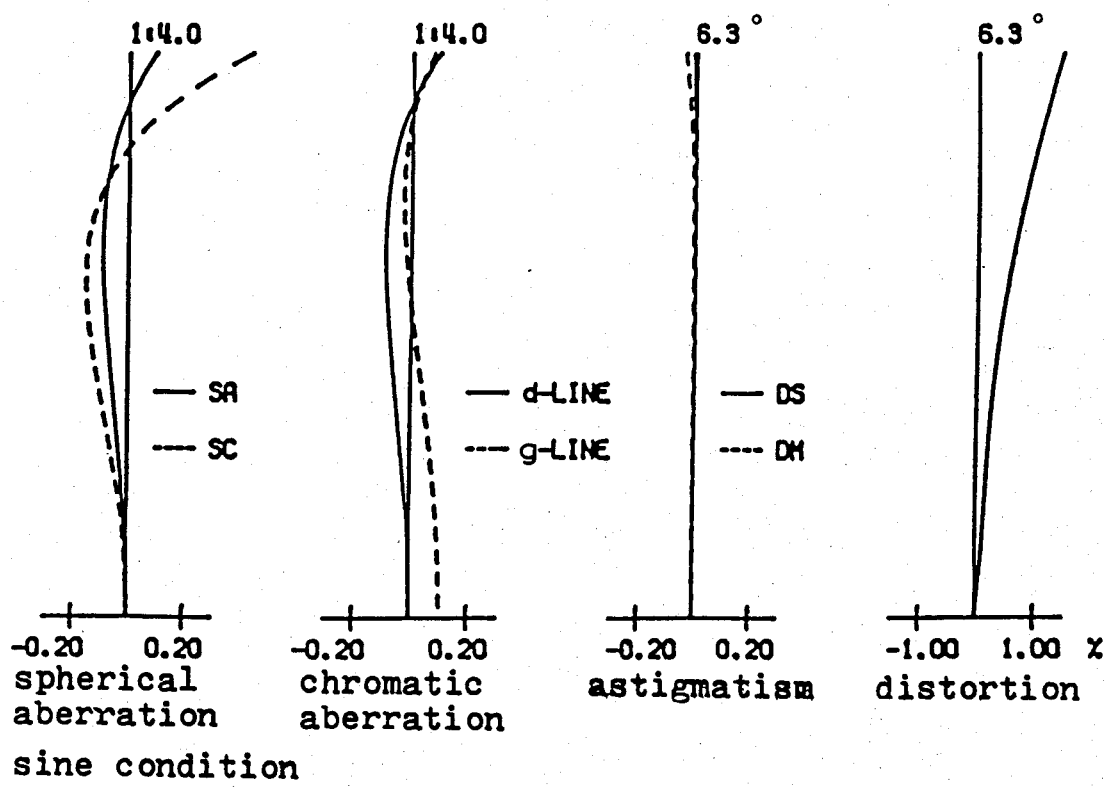

A small-size telephoto lens according to the present invention is in the form of a six-element lens system comprising, in order from an object, a first positive lens, a second negative lens, third and fourth positive-meniscus lenses having convex surfaces directed toward the object, a fifth negative lens, and a sixth positive lens. The lens system is arranged to meet the following conditions:

(1) $0.4f < f_{1,2,3} < 0.75f$
(2) $0.35f < f_{1,2,3,4} < 0.6f$
(3) $0.65f < f_1 < 0.8f$
(4) $d_2 < 0.02f$
(5) $0.2f < |f_{5,6}| < 0.45f$, $f_{5,6} < 0$
(6) $0.05 < n_5 - n_6$ where
f is the focal length of the overall lens system,
$f_{1,2,3}$ is the combined focal length of the first through third lenses,
$f_{1,2,3,4}$ is the combined focal length of the first through fourth lenses,
$f_1$ is the focal length of the first lens,
$d_2$ is the distance between the first and second lenses,
$f_{5,6}$ is the combined focal length of the fifth and sixth lenses,
$n_5$ is the refractive index of the fifth lens, and
$n_6$ is the refractive index of the sixth lens.

The foregoing conditions are described below.

The conditions (1) and (2) serve to both make the overall length of the lens system shorter and improve the focusing performance.

If the lower limit of the condition (1) is exceeded, then the retracting power is increased, an advantage for the shortening of the overall length. However, various aberrations, particularly chromatic aberration and Petzval sum, become worse, failing to improve the lens performance. Conversely, if the upper limit of the condition (1) is exceeded, then the refracting power is reduced and hence aberrations can be better corrected. However, it would be difficult to shorten the overall length of the lens system.

The condition (2) is related to the condition (1) in that it is required to aid in rendering the lens system smaller in size and improving the performance thereof. Like the condition (1), if the lower limit of the condition (2) is exceeded, then various aberrations are increased, failing to achieve higher performance. If the upper limit of the condition (2) is exceeded, it would be difficult to make the lens system compact.

The conditions (3) and (4) are concerned with the refractive power of the first lens and the air gap between the first and second lenses. According to the Publication No. 53-27422, the first lens is given a relatively strong refracting power and the first and second lenses are widely air-spaced from each other in order to shorten the overall length of the lens system. This allows an increased refractive power of a front lens group in the telephoto lens, and shortens the overall length of the lens system. However, aberrations, particularly spherical aberration, in the front lens group remain uncorrected, and the contract of an image at lower frequencies becomes poorer.

According to the principles of the present invention, aberrations caused by the lenses are reduced as much as possible, and any aberrations produced are corrected as early as possible by locating lens surfaces to be corrected as well as possible. Based on such principles, the refracting power of the first lens is selected to be relatively small for suppressing the generation of aberrations, and the air space between the first and second lenses is reduced for enabling the second lens to immediately correct aberrations caused by the first lens.

If the lower limit of the condition (3) is exceeded, then the refracting power of the first lens becomes stronger and hence the overall length of the lens system can be reduced. However, spherical and chromatic aberrations will fall short of being fully corrected, and good lens performance cannot be maintained. If the upper limit is exceeded, then the refracting power will become smaller, failing to enable the entire length of the lens system to be shortened. An attempt to shorten the entire length of the lens system with the focal length in excess of the upper limit will place an increased burden on the refracting power of the third lens, producing spherical aberration and astigmatism that cannot be fully corrected.

If condition (4) is not met, the distance between the first and second lenses will be increased and, hence, the combined refracting power of the first and second lenses will be increased, an advantage for the shortening of the overall length of the lens system. However, an increase in the inter-lens distance will cause a light ray which passes through the first lens to enter the second lens at a position close to the optical axis, thus reducing the capacity of the second lens to correct aberrations. Aberrations due to the first and second lenses as a whole therefore would be increased in this case.

The conditions (3) and (4) mainly serve to increase the focusing performance of the lens system, but do not contribute much to the shortening of the overall length of the lens system. It is therefore necessary to add another condition for other lens elements to achieve desired compactness. Such another condition is given by the condition (5).

The condition (5) is directed to the combined refracting power of the fifth and sixth lenses. The fifth and sixth lenses correspond to a so-called rear lens group in a telephoto lens. The fifth and sixth lenses as a whole have a negative refracting power. The greater the refracting power, the shorter the full length of the lens system. In the Publication No. 53-27422, the fifth and sixth lenses are cemented together, and there is no substantial difference between the refractive indices of glass materials of the fifth and sixth lenses. With the prior art arrangement, however, the cemented lens surfaces only serve to make an achromatic lens, and the ability of the fifth and sixth lenses to correct aberrations is not fully put to use. The conventional arrangement is also disadvantageous in that an effort to make the refracting power stronger results in a reduction in the Petzval sum.

According to the present invention, the fifth and sixth lenses remain uncemented, and the refractive indices of glass materials of the fifth negative lens and the sixth positive lens are different from each other to thereby make an achromatic lens, and correct distortion and Petzval sum. Separation of the fifth and sixth lenses increases leeway in lens designing, gives a strong negative refracting power to the fifth and sixth lenses as a whole, and is effective in shortening the overall length of the lens system.

If the lower limit of the condition (5) is exceeded, then the combined refracting power of the fifth and sixth lenses as a negative lens will be too strong. Although this would be effective in reducing the overall lens system length, chromatic aberration and Petzval sum cannot be corrected easily, and good lens performance cannot be accomplished. If the upper limit of the condition (6) is exceeded, then the combined refracting power of the fifth and sixth lenses will become too weak, a disadvantage which would make it difficult to make the entire lens system compact in size.

The condition (6) is directed to the refractive indices of glass materials of the fifth and sixth lenses. The Petzval sum $\Sigma p$ is generally expressed by:

$$\Sigma p = \phi i / n i$$

where $\phi i$ and $n i$ are the refracting power and refractive index of glass material, respectively, of the ith lens. Generally in telephoto lenses, the shorter the overall length, the smaller the Petzval sum $\Sigma p$, resulting in a tendency to increase the curvature of field. According to the present invention, the fifth negative lens is made of a glass material having a higher refractive index, and the sixth positive lens is made of a glass material having a lower refractive index, thereby preventing a reduction in the Petzval sum $\Sigma p$. The condition (6) is provided to ensure the above requirement.

If the condition (6) is not met, the refractive indices of glass materials of the fifth and sixth lenses will be substantially equal to each other, or the refractive index of glass material of the fifth lens will become lower. Therefore, the Petzval sum $\Sigma p$ will be reduced and the curvature of field and astigmatism will be increased, thus making it difficult to both shorten the overall length of the lens system and maintain good lens performance.

Specific examples of lenses according to the present invention will now be described. Throughout the examples, f designates the focal length, $f_B$ the back focus, r the radius of curvature, d the lens thickness or lens distance, n the refractive index, and $\nu$ the Abbe number.

EXAMPLE 1

(FIG. 1)

| | f = 100, r | FNO 1:4.0, d | $f_B$ = 32.50 n | $\nu$ |
|---|---|---|---|---|
| 1 | 35.906 | | 1.51633 | 64.1 |
| | | 3.16 | | |
| 2 | 743.002 | | | |
| | | 1.01 | | |
| 3 | −195.959 | | 1.76182 | 26.6 |
| | | 1.13 | | |
| 4 | 115.403 | | | |
| | | 0.05 | | |
| 5 | 28.295 | | 1.51633 | 64.1 |
| | | 2.91 | | |
| 6 | 77.569 | | | |
| | | 23.12 | | |
| 7 | 33.415 | | 1.51633 | 64.1 |
| | | 1.46 | | |
| 8 | 70.853 | | | |
| | | 10.64 | | |
| 9 | −17.946 | | 1.74400 | 44.7 |
| | | 0.92 | | |
| 10 | 29.599 | | | |
| | | 1.51 | | |
| 11 | 35.016 | | 1.64769 | 33.8 |
| | | 1.82 | | |
| 12 | −35.016 | | | |

$f_{1,2,3} = 0.667f$
$f_{1,2,3,4} = 0.506f$
$f_1 = 0.730f$
$|f_{5,6}| = 0.406f$

EXAMPLE 2

(FIG. 3)

| | f = 100, r | FNO 1:4.1, d | $f_B$ = 31.02 n | $\nu$ |
|---|---|---|---|---|
| 1 | 34.750 | | 1.51633 | 64.1 |
| | | 3.15 | | |
| 2 | 729.608 | | | |
| | | 0.77 | | |
| 3 | −183.769 | | 1.78472 | 25.7 |
| | | 1.03 | | |
| 4 | 125.122 | | | |
| | | 0.05 | | |
| 5 | 28.005 | | 1.51633 | 64.1 |
| | | 2.82 | | |
| 6 | 78.825 | | | |
| | | 23.75 | | |
| 7 | 34.060 | | 1.51633 | 64.1 |
| | | 1.33 | | |
| 8 | 75.868 | | | |

-continued

| | f = 100, r | FNO 1:4.1, d | $f_B$ = 31.02 n | ν |
|---|---|---|---|---|
| 9 | −17.189 | 9.90 | 1.74320 | 49.3 |
| 10 | 32.120 | 0.77 | | |
| 11 | 37.614 | 1.26 | 1.63980 | 34.5 |
| 12 | −37.614 | 1.82 | | |

$f_{1, 2, 3} = 0.637f$
$f_{1, 2, 3, 4} = 0.492f$
$f_1 = 0.706f$
$|f_{5, 6}| = 0.352f$

EXAMPLE 3

(FIG. 5)

| | f = 100, r | FNO 1:4.1, d | $f_B$ = 31.79 n | ν |
|---|---|---|---|---|
| 1 | 33.326 | 3.10 | 1.49700 | 81.6 |
| 2 | 324.373 | 1.01 | | |
| 3 | −151.147 | 0.98 | 1.80518 | 25.4 |
| 4 | 190.109 | 0.05 | | |
| 5 | 25.219 | 3.30 | 1.51633 | 64.1 |
| 6 | 97.022 | 24.56 | | |
| 7 | 65.320 | 1.01 | 1.51633 | 64.1 |
| 8 | 112.247 | 4.93 | | |
| 9 | −13.885 | 0.73 | 1.78590 | 44.2 |
| 10 | 23.379 | 0.42 | | |
| 11 | 23.549 | 1.82 | 1.64769 | 33.8 |
| 12 | −22.244 | | | |

$f_{1, 2, 3} = 0.527f$
$f_{1, 2, 3, 4} = 0.488f$
$f_1 = 0.745f$
$|f_{5, 6}| = 0.346f$

EXAMPLE 4

(FIG. 7)

| | f = 100, r | FNO 1:4.0, d | $f_B$ = 32.10 n | ν |
|---|---|---|---|---|
| 1 | 31.902 | 3.24 | 1.49700 | 81.6 |
| 2 | 384.956 | 1.10 | | |
| 3 | −117.699 | 0.95 | 1.68893 | 31.1 |
| 4 | 136.349 | 0.05 | | |
| 5 | 23.142 | 3.44 | 1.49700 | 81.6 |
| 6 | 90.703 | 22.97 | | |
| 7 | 68.929 | 0.98 | 1.48749 | 70.1 |
| 8 | 302.706 | 4.87 | | |
| 9 | −13.058 | 0.71 | 1.78590 | 44.2 |
| 10 | 20.813 | 0.10 | | |

-continued

| | f = 100, r | FNO 1:4.0, d | $f_B$ = 32.10 n | ν |
|---|---|---|---|---|
| 11 | 19.639 | 1.82 | 1.64769 | 33.8 |
| 12 | −23.050 | | | |

$f_{1, 2, 3} = 0.515f$
$f_{1, 2, 3, 4} = 0.457f$
$f_1 = 0.698f$
$|f_{5, 6}| = 0.297f$

Although certain preferred embodiments have been shown and described, it will be understood to those skilled in the art that many changes and modifications may be made therein without departing from the spirit and scope of the appended claim.

What is claimed is:

1. A six-element telephoto lens sytem comprising, in order from an object, a first positive lens, a second negative lens, third and fourth positive-meniscus lenses having convex surfaces directed toward the object, a fifth negative lens, and a sixth positive lens, said lens system being arranged to meet the following conditions (1) $0.4f < f_{1, 2, 3} < 0.75f$
(2) $0.35f < f_{1, 2, 3, 4} < 0.6f$
(3) $0.65f < f_1 < 0.8f$
(4) $d_2 < 0.02f$
(5) $0.2f < |f_{5, 6}| < 0.45f$, $f_{5, 6} < 0$
(6) $0.05 < n_5 - n_6$ where
f is the focal length of the overall lens system,
$f_{1, 2, 3}$ is the combined focal length of the first through third lenses,
$f_{1, 2, 3, 4}$ is the combined focal length of the first through fourth lenses,
$f_1$ is the focal length of the first lens,
$d_2$ is the distance between the first and second lenses,
$f_{5, 6}$ is the combined focal length of the fifth and sixth lenses,
$n_5$ is the refractive index of the fifth lens, and
$n_6$ is the refractive index of the sixth lens.

2. A telephoto lens system of claim 1 where conditions 4 and 6 are as follows:

(4) $d_2 < 0.015$ f and
(6) $0.08 < n_5 - n_6$.

3. A six-element telephoto lens system comprising, in order from an object, a first positive lens, a second negative lens, third and fourth positive-meniscus lenses having convex surfaces directed toward the object, a fifth negative lens, and a sixth positive lens, said lens system being composed of lenses with the following conditions;

| | r | d | n | ν |
|---|---|---|---|---|
| 1 | 35.906 | 3.16 | 1.51633 | 64.1 |
| 2 | 743.002 | 1.01 | | |
| 3 | −195.959 | 1.13 | 1.76182 | 26.6 |
| 4 | 115.403 | 0.05 | | |
| 5 | 28.295 | 2.91 | 1.51633 | 64.1 |
| 6 | 77.569 | 23.12 | | |
| 7 | 33.415 | 1.46 | 1.51633 | 64.1 |
| 8 | 70.853 | 10.64 | | |

-continued

| | r | d | n | ν |
|---|---|---|---|---|
| 9 | −17.946 | | 1.74400 | 44.7 |
| | | 0.92 | | |
| 10 | 29.599 | | | |
| | | 1.51 | | |
| 11 | 35.016 | | 1.64769 | 33.8 |
| | | 1.82 | | |
| 12 | −35.016 | | | |

$f_{1,2,3} = 0.667f$
$f_{1,2,3,4} = 0.506f$
$f_1 = 0.730f$
$|f_{5,6}| = 0.406f$
$f = 100$
$f_b = 32.50$ where
 f is the focal length of the overall lens system,
 $f_b$ is the back focus,
 $f_{1,2,3}$ is the combined focal length of the first through third lenses,
 $f_{1,2,3,4}$ is the combined focal length of the first through fourth lenses,
 $f_1$ is the focal length of the first lens,
 $f_{5,6}$ is the combined focal length of the fifth and sixth lenses,
 r is the radius of curvature of the lens surfaces,
 d is the lens thickness or lens distance,
 n is the refractive index,
 ν is the Abbe's number.

4. A six-element telephoto lens system comprising, in order from an object, a first positive lens, a second negative lens, third and fourth positive-meniscus lenses having convex surfaces directed toward the object, a fifth negative lens, and a sixth positive lens, said lens system being composed of lenses with the following conditions;

| | r | d | n | ν |
|---|---|---|---|---|
| 1 | 34.750 | | 1.51633 | 64.1 |
| | | 3.15 | | |
| 2 | 729.608 | | | |
| | | 0.77 | | |
| 3 | −183.769 | | 1.78472 | 25.7 |
| | | 1.03 | | |
| 4 | 125.122 | | | |
| | | 0.05 | | |
| 5 | 28.005 | | 1.51633 | 64.1 |
| | | 2.82 | | |
| 6 | 78.825 | | | |
| | | 23.75 | | |
| 7 | 34.060 | | 1.51633 | 64.1 |
| | | 1.33 | | |
| 8 | 75.868 | | | |
| | | 9.90 | | |
| 9 | −17.189 | | 1.74320 | 49.3 |
| | | 0.77 | | |
| 10 | 32.120 | | | |
| | | 1.26 | | |
| 11 | 37.614 | | 1.63980 | 34.5 |
| | | 1.82 | | |
| 12 | −37.614 | | | |

$f_{1,2,3} = 0.637f$
$f_{1,2,3,4} = 0.492f$
$f_1 = 0.706f$
$|f_{5,6}| = 0.352f$
$f = 100$
$f_b = 31.02$ where
 f is the focal length of the overall lens system,
 $f_b$ is the back focus,
 $f_{1,2,3}$ is the combined focal length of the first through third lenses,
 $f_{1,2,3,4}$ is the combined focal length of the first through fourth lenses,
 $f_1$ is the focal length of the first lens,
 $f_{5,6}$ is the combined focal length of the fifth and sixth lenses,
 r is the radius of curvature of the lens surfaces,
 d is the lens thickness or lens distance,
 n is the refractive index,
 ν is the Abbe's number.

5. A six-element telephoto lens system comprising, in order from an object, a first positive lens, a second negative lens, third and fourth positive-meniscus lenses having convex surfaces directed toward the object, a fifth negative lens, and a sixth positive lens, said lens system being composed of lenses with the following conditions;

| | r | d | n | ν |
|---|---|---|---|---|
| 1 | 33.326 | | 1.49700 | 81.6 |
| | | 3.10 | | |
| 2 | 324.373 | | | |
| | | 1.01 | | |
| 3 | −151.147 | | 1.80518 | 25.4 |
| | | 0.98 | | |
| 4 | 190.109 | | | |
| | | 0.05 | | |
| 5 | 25.219 | | 1.51633 | 64.1 |
| | | 3.30 | | |
| 6 | 97.022 | | | |
| | | 24.56 | | |
| 7 | 65.320 | | 1.51633 | 64.1 |
| | | 1.01 | | |
| 8 | 112.247 | | | |
| | | 4.93 | | |
| 9 | −13.885 | | 1.78590 | 44.2 |
| | | 0.73 | | |
| 10 | 23.379 | | | |
| | | 0.42 | | |
| 11 | 23.549 | | 1.64769 | 33.8 |
| | | 1.82 | | |
| 12 | −22.244 | | | |

$f_{1,2,3} = 0.527f$
$f_{1,2,3,4} = 0.488f$
$f_1 = 0.745f$
$|f_{5,6}| = 0.346f$
$f = 100$
$f_b = 31.79$ where
 f is the focal length of the overall lens system,
 $f_b$ is the back focus,
 $f_{1,2,3}$ is the combined focal length of the first through third lenses,
 $f_{1,2,3,4}$ is the combined focal length of the first through fourth lenses,
 $f_1$ is the focal length of the first lens,
 $f_{5,6}$ is the combined focal length of the fifth and sixth lenses,
 r is the radius of curvarture of the lens surfaces,
 d is the lens thickness or lens distance,
 n is the refractive index,
 ν is the Abbe's number.

6. A six-element telephoto lens system comprising, in order from an object, a first positive lens, a second negative lens, third and fourth positive-meniscus lenses having convex surfaces directed toward the object, a fifth negative lens, and a sixth positive lens, said lens system being composed of lenses with the following conditions;

| | r | d | n | v |
|---|---|---|---|---|
| 1 | 31.902 | | 1.497000 | 81.6 |
| | | 3.24 | | |
| 2 | 384.956 | | | |
| | | 1.10 | | |
| 3 | −117.699 | | 1.68893 | 31.1 |
| | | 0.95 | | |
| 4 | 136.349 | | | |
| | | 0.05 | | |
| 5 | 23.142 | | 1.497000 | 81.6 |
| | | 3.44 | | |
| 6 | 90.703 | | | |
| | | 22.97 | | |
| 7 | 68.929 | | 1.48749 | 70.1 |
| | | 0.98 | | |
| 8 | 302.706 | | | |
| | | 4.87 | | |
| 9 | −13.058 | | 1.78590 | 44.2 |
| | | 0.71 | | |
| 10 | 20.813 | | | |
| | | 0.10 | | |
| 11 | 19.639 | | 1.64769 | 33.8 |
| | | 1.82 | | |

-continued

| | r | d | n | v |
|---|---|---|---|---|
| 12 | −23.050 | | | |

$f_{1,2,3} = 0.515f$
$f_{1,2,3,4} = 0.457f$
$f_1 = 0.698f$
$|f_{5,6}| \ 0.297f$
$f = 100$
$f_b = 32.10$ where
f is the focal length of the overall lens system,
$f_b$ is the back focus,
$f_{1,2,3}$ is the combined focal length of the first through third lenses,
$f_{1,2,3,4}$ is the combined focal length of the first through fourth lenses,
$f_1$ is the focal length of the first lens,
$f_{5,6}$ is the combined focal length of the fifth and sixth lenses,
r is the radius of curvature of the lens surfaces, d is the lens thickness or lens distance,
n is the refractive index,
v is the Abbe's number.

* * * * *